March 27, 1934.    S. A. CRONE    1,952,045
SAFETY ATTACHING MEANS
Filed Sept. 14, 1932
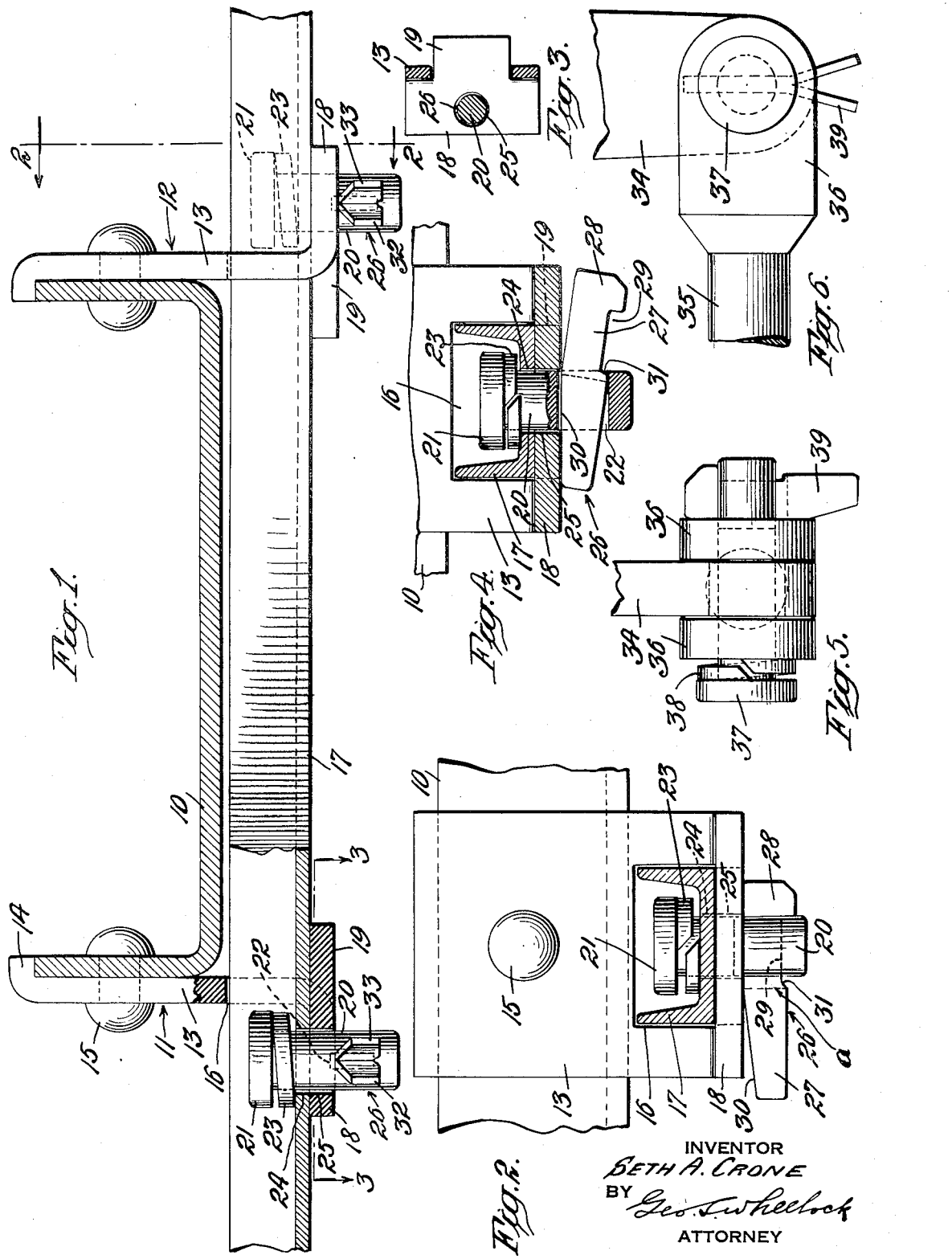
INVENTOR
SETH A. CRONE
BY Geo. T. Wheelock
ATTORNEY Patented Mar. 27, 1934

1,952,045

UNITED STATES PATENT OFFICE 1,952,045

SAFETY ATTACHING MEANS

Seth A. Crone, East Orange, N. J., assignor to Buffalo Brake Beam Company, New York, N. Y., a corporation of New York Application September 14, 1932, Serial No. 633,067

12 Claims. (Cl. 188—210)

The present invention relates to safety attaching means more particularly for use in connecting together certain members of a car-truck equipment; and an object of the invention is to provide a minimum number of parts for attaching such members, which may be stationary or they may be relatively movable, and when stationary they may reside in a spring plank or truck bolster for supporting a safety bar for supporting a brake-beam in case it may suffer such an accident as to drop on the bar, or they may reside in the members of the brake mechanism.

Another object of the invention is to bind or confine such car-truck equipment members together, with perhaps the possibility of the slightest movement mutually toward or from each other sufficient to allow a little give in such directions due to shocks or the like, without obtaining a real cushioning effect—rather to obtain a kind of pseudo-cushioning effect—but which safety attaching means efficiently prevent possibly disastrous vibration or rattle of the assembled elements, that is the attached members as well as the attaching means, when the truck is moving over a railroad track.

Other objects of the invention are to provide a simple and practical construction in these respects and to provide a construction which is inexpensive, especially when considering the efficiency and reliability thereof.

Another object of the invention is to use an efficient locking element, such as a special key which is adapted to pass through a through-bolt so as to hold the bolt against possible displacement and which is claimed in a division of this application.

Still another object of the invention is to provide a special construction of hanger bracket which may be supported from a spring plank or truck bolster and to in turn support a safety bar for supporting a brake-beam in case of emergency.

These being among the objects of the present invention, the same consists of certain features of construction and combinations of parts to be hereinafter described and then claimed with reference to the accompanying drawing illustrating preferred embodiments of the invention and wherein Fig. 1 is a broken sectional view of a stationary truck-member provided with the improved means for supporting and attaching a safety bar;

Fig. 2 is a sectional elevation in the direction of one side of the stationary truck-member, the section being taken on the line 2—2, Fig. 1;

Fig. 3 is a horizontal section on a reduced scale to show special features of the hanger bracket, through which such section is taken;

Fig. 4 is a section somewhat similar to Fig. 2, except that it is taken also through the lower end of the hanger bracket, such view illustrating the manner in which a special locking key is operated;

Fig. 5 is an elevation to show movable members of a brake mechanism secured together by the improved safety attaching means; and Fig. 6 is a side elevation as viewed from the left of Fig. 5.

Referring to Figs. 1, 2 and 4, a stationary truck-member 10 is shown as a spring plank, although it might be the truck bolster. Hanger brackets 11, 12 are secured to the truck-member 10 at each side thereof, and each bracket is made of bendable metal such as rolled steel. Each bracket 11, 12 includes a body or leg 13 having an inturned lip 14 to engage over the upper edge of the spring plank 10, to which the bracket is rigidly secured by means of a rivet 15 upset at each end. There is a hole or aperture 16 formed in the leg of each bracket, and through the said holes 16 a safety bar 17 passes, such bar being of any desired type, it being shown here as a channel bar with a pair of flanges. In some cases as shown by the prior art the safety bar 17 is bolted to corresponding sides of suitable hanger brackets so that the brackets do not require holes 16, and in other cases as shown by the prior art it is not necessary to employ hanger brackets, as where the safety bar is attached directly to the truck-member 10, such as a spring plank. Where holes 16 are used they are made sufficiently larger than the cross-section of the safety bar so as to leave a clearance, as shown.

Each bracket 11, 12 as specifically shown preferably is provided at its lower end with foot portions 18, 19. The foot portion 18 is provided by bending the lower end of the hanger bracket outwardly as shown in Figs. 1 and 3 and the foot portion 19 is shown as bent or deflected so as to extend in opposite direction to the foot portion 18. Preferably the foot portion 19 is struck out from the hanger bracket, thereby to leave the hole 16 in the bracket, so that the bracket and its foot portions are formed preferably in one part. Preferably the foot portions 18, 19 are deflected in opposite directions so as to extend in the same horizontal plane, so as to provide large bearing areas for the support of the safety bar 17 and of a size amply sufficient to receive a hole for a fastening means.

The preferred means for securing the safety bar either directly to the spring plank, or as specifically illustrated, to the hanger brackets, will now be described. In other words, such attaching means may be of the same construction in both cases, and the alternative of securing the safety bar directly to the spring plank need not be illustrated. A bolt 20 of large diameter, say an inch or more, is provided for connecting a safety bar with each bracket. Preferably the bolt is provided with a large head 21 to constitute an ample bearing member of the bolt. Each such bolt is provided at its unheaded end with a diametrical through slot 22, the greater width of which extends in a plane with the longitudinal axis of the bolt. Encircling each bolt at a point directly under the head 21 is a helical spring 23 made of sufficiently heavy spring metal and preferably formed with a single convolution so as to provide a split spring washer. Each bolt 20 is passed through registering holes 24, 25 respectively formed in the supporting bar 17 and the foot portion 18 of the hanger bracket. As here shown the helical spring 23 is positioned so as to bear on the supporting bar at points underneath the bolt head 21, although as will be obvious to those skilled in the art, such spring may be otherwise disposed with relation to the parts to be attached together.

Referring to Figs. 2 and 4 there will be seen the preferred construction of locking element to cooperate with the bolt and the spring 23. Inasmuch as the bolt is shown as slotted, the locking element used with such bolt takes the form of a key 26. This key has a flat body 27 formed at one end with a flat head 28, and intermediately of the length of the key it is provided in one edge with a longitudinal notch or recess 29 which is somewhat shallow. At the other end of the key 26, the edge opposite to the notched edge is formed with an incline 30 which preferably extends for nearly one-half of the length of the key and which imparts to the key a wedge shaped end, located beyond the notch 29. The end part of the notch located adjacent the wedge portion of the key is preferably formed as an inclined shoulder 31, the incline being in a direction away from the notch.

Such a wedge-key is preferably composed of hard steel, and made of suitable proportions to serve for its intended locking function. It will be seen that the body or shank of the key is widest along a line transversely of the key as shown in broken lines at a, such major width being located between the notch 29 and the inclined edge 30, and the dimension here involved is somewhat less than the length of the slot 22 in the direction in which the longitudinal axis of the bolt extends.

In Fig. 4 it is shown how the wedge key acts in applying it to the bolt 20. Although a solid washer may be arranged between the inclined edge of the key and the bracket foot portion 18, Fig. 4 shows the key as bearing directly upon such foot portion. The small end of the wedge of the key is first inserted into the slot 22 of the bolt, the inclined edge portion 30 being presented towards the foot portion 18. The helical spring 23 begins to be placed under tension as soon as the wedge end of the key has been driven into the slot 22 for a little distance, and as the key is further driven in, the spring 23 is more greatly compressed and when driven in far enough so as to register the notch 29 with the unslotted end portion of the bolt, such end portion snaps into the notch so as to interlock therewith, the spring being somewhat relieved of pressure and taking the position approximately as shown in Fig. 2. Inasmuch as the key is of greater width transversely of the notch, than it is at the extreme end of its wedge portion, the spring 23 is held under considerable pressure, in the position substantially as shown in Fig. 2, and the strong tension of the spring acting between the safety bar 17 and the head of the bolt, binds the safety bar to the foot portions 18, 19 of the hanger bracket and secures a reliable locking together of the key 26 and the bolt. Thus the connected truck members will be strongly held together, yet allowing a very slight relative movement, but so holding the members together as well as the attaching means, that no rattling of the assembled elements can take place and no vibration which would cause disastrous wear or ultimate wear of the parts. The construction tends to eliminate all wear; at least it materially extends the life of the assembled elements.

It will be noted that if the helical spring 23 had been pressed solidly down and flattened against the opposed supporting member that little if any cushioning of the safety bar or other member would occur, and hence the bar could not yield relatively to the supporting member, but inasmuch as the helical form of the spring is partly maintained when the bolt is tightened as far as desirable, and as the space between the head of the bolt and the opposed member is then greater than the thickness of the metal body of the spring, the partially expanded spring permits the yielding of the safety bar. Advantage of this condition may be had in association with parts which are ordinarily compressed solidly together, but which degree of compression is avoided under the present invention, which is furthermore particularly desirable when supporting the safety bars by a spring plank, as it has been found that in practice the running of a car upon railway rails produces a buckling action or a weaving action of the spring plank due largely to the undulations of the rails sometimes characterized as the "wave motion" of the rails, and such action results in frequently loosening the fastenings for the reason that the parts secured thereby are usually solidly or rigidly held together.

As more clearly shown in Fig. 1, the key 26 may be formed of a doubled over strip of steel flattened down, the ends 32, 33 of the strip being bent outwardly, and held spread apart due to the springiness of the metal so that when the key is applied to the bolt it may be more reliably held in position. The length of the spread apart ends 32, 33 is approximately defined by the transverse broken line shown in Figs. 2 and 4. If for any reason it be desired to remove the key from the bolt, such removal is facilitated by the inclined shoulder 31 which acts on the bolt so as to compress the spring 23 as the key is withdrawn.

Referring to Figs. 5 and 6, this modification of the invention showns a brake-lever 34 and a brake-rod 35, or rather parts thereof, these forming part of the brake mechanism used in a car-truck. The brake-rod 35 is provided with a fork 36 into which is inserted the adjacent end of the brake lever 34, these being provided with registering apertures for receiving the headed bolt 37. The helical spring 38 is positioned between the head of the bolt and the fork 36, while the key 39 extends through the opposite end of the bolt. The construction of the bolt, the spring and key do not require further explanation in this connection, inasmuch as they have already been described in detail. The brake members 34 and 35 will thus be reliably secured together by the improved securing means, and no rattling can take place.

It will be obvious to those skilled in the art that the invention as shown and described is susceptible to a considerable range of modification without departing from the spirit of the invention as defined in the appended claims.

What I claim as new is—

1. In safety attaching means, the combination of a supporting member, a member to be supported thereby, the members forming parts of a car-truck equipment and having holes to receive a bolt, a bolt passing through the holes and having a head member at one end, a helical spring in the form of a split washer having a single convolution surrounding the bolt, and a relatively movable locking element positively secured in operative relation with the other end of the bolt to compress the spring washer against one of the members and bind the members together in assembled anti-rattling relation, the helical form of the spring being partially maintained when the parts are thus assembled and the space between the head member and such one member of the truck being then greater than the thickness of the body of the spring, to permit the supported member to yield or cushion relatively to the supporting member.

2. In safety attaching means, the combination of a supporting member, a member to be supported thereby, the members forming parts of a car-truck equipment and having holes to receive a bolt, a bolt passing through the holes and having an integral head at one end, a helical spring in the form of a split washer having a single convolution surrounding the bolt, and a relatively movable locking element positively secured in operative relation with the other end of the bolt to compress the spring washer against one of the members and bind the members together in assembled anti-rattling relation, the spring washer being located between the head and the supporting member, and its helical form being partially maintained when the parts are thus assembled and the space between the head member and such one member of the truck being then greater than the thickness of the body of the spring, to permit the supported member to yield or cushion relatively to the supporting member.

3. In safety attaching means, the combination of a spring-plank and a supporting member thereon forming part of the equipment of a car truck, a safety supporting bar for a brake-beam, the supporting member and bar having holes to receive a bolt, a headed bolt passing through the holes, a helical spring in the form of a split washer surrounding the bolt, and a relatively movable locking member positively secured in operative relation with the unheaded end of the bolt to compress the spring washer against the member or bar and bind the member and bar in assembled anti-rattling relation, the spring washer being located between the head and the locking element, and its helical form being partially maintained when the parts are thus assembled, and the space in which the spring is located under the head being greater than the thickness of the body of the spring to permit the safety bar to yieldingly move relatively to the supporting member.

4. In safety attaching means, the combination of a supporting member forming part of the equipment of a car truck, such member having a foot-portion and a hole thereabove, a safety supporting bar for a brake-beam, the bar passing through the hole and resting on the foot-portion, and the foot-portion and bar having registering holes, a headed bolt passing through the registering holes, a helical spring in the form of a split washer surrounding the bolt, and a relatively movable locking member positively secured in operative relation with the unheaded end of the bolt to compress the spring washer against the member or bar and bind the member and bar in assembled anti-rattling relation, the spring washer being located between the head and the locking element, and its helical form being partially maintained when the parts are thus assembled, and the space in which the spring is located under the head being greater than the thickness of the body of the spring to permit the safety bar to yieldingly move relatively to the supporting member.

5. In safety attaching means, the combination of a supporting member, a member to be supported thereby, the members forming parts of a car-truck equipment and having registering holes, a headed bolt passing through the holes, a helical spring having a single convolution and surrounding the bolt underneath the head, and a relatively movable locking key of wedge-shape positively secured in operative relation with the unheaded end of the bolt to move the head against the spring and cause it to bear firmly upon one of the members and to bind the members together in assembled anti-rattling relation, and the helical form of the spring being partially maintained when the parts are thus assembled, and the space in which the spring is located under the head being then greater than the thickness of the body of the spring to permit the supported member to yieldingly move relatively to the supporting member.

6. In safety attaching means, the combination of a supporting member, a member to be supported thereby, the members forming parts of a car-truck equipment, the supporting member having a foot and a hole above the foot, the supported member passing through the hole and seated upon the foot, and the supported member and foot having registering holes, a headed bolt passing through the registering holes, a helical spring having a single convolution and surrounding the bolt underneath the head, and a relatively movable locking element positively secured in operative relation with the unheaded end of the bolt to move the head against the spring and cause it to bear firmly upon the supported member and to bind the members together in assembled anti-rattling relation, and the helical form of the spring being partially maintained when the parts are thus assembled, and the space in which the spring is located under the head being then greater than the thickness of the body of the spring to permit the supported member to yieldingly move relatively to the supporting member.

7. In safety attaching means, the combination of a supporting member, a member to be supported thereby, the members forming parts of a car-truck equipment and having registering holes, a bolt passing through the holes and having a bearing member at one end, a spring around the bolt and located under the bearing member to bear against one of the truck-parts, the other end of the bolt having a diametrical through-slot, and a key having a wedge-shaped end and a longitudinal notch in the other end, the wedge-shaped end adapted to be driven into the slot and to compress the spring, and the portion of the bolt beyond the slot to lock into the notch when the key is fully driven in, whereby the key is held under strong spring tension against the other truck part and the assemblage locked together in anti-rattling relation, the space in which the compressed spring is located being as much greater than its thickness when compressed by the wedge-shaped end as is the depth of the notch of the key, so as to cushion the supported member and permit it to move relatively to the supporting member.

8. In safety attaching means, the combination of a supporting bracket forming part of the equipment of a car truck, such member having a foot-portion and a hole thereabove, a safety supporting bar for a brake-beam, the bar passing through the hole and seated on the foot-portion, and the foot-portion and bar having registering holes, a headed bolt passing through the registering holes, a spring around the bolt and located under its head to bear on the safety bar, the other end of the bolt having a diametrical through-slot located just outside the foot-portion, and a key having a wedge-shaped end and a longitudinal notch in its other end, the wedge-shaped end adapted to be driven into the slot and to compress the spring and the portion of the bolt beyond the slot to lock into the notch when the key is fully driven in, whereby the key is held under strong spring tension against the foot-portion to lock the parts together in anti-rattling relation, and the helical form of the spring being partially maintained when the parts are thus assembled, and the space in which the spring is located under the head being then greater than the thickness of the body of the spring to permit the supported member to yieldingly move relatively to the supporting member.

9. In safety supporting means, the combination of a car truck member, a hanger bracket rigidly secured to the truck member to hang from the same, the bracket having foot-portions extending in opposite directions therefrom on which to support a safety bar for a brake beam, one of the foot-portions formed from the bent lower end of the bracket, and the other foot portion from a deflected part of the bracket struck out from above the bent end.

10. In safety supporting means, the combination of a car truck member, a hanger bracket rigidly secured to the truck member to hang from the same, the bracket having foot-portions extending in opposite directions therefrom on which to support a safety bar for a brake beam, one of the foot-portions formed from the bent lower end of the bracket, and the other foot-portion from a deflected part of the bracket struck out from above the bent end, the bracket having a hole formed by the removal of the struck-out part, for the passage of such a bar.

11. In safety supporting means, the combination of a car truck member, a hanger bracket secured to the truck-member, the bracket having oppositely extending foot-portions bent therefrom and arranged in the same plane, a safety bar for a brake-beam seated on the foot-portions, each foot-portion having considerable bearing area for supporting the bar and having a hole, and fastening means for connecting the safety bar directly to one of the foot-portions, such means passing through the hole.

12. In safety supporting means, the combination of a car truck member, a hanger bracket secured to the truck-member, the bracket having oppositely extending foot-portions arranged in the same plane, a safety bar for a brake-beam seated on the foot-portions, and means for securing the safety bar to one of the foot-portions, and the bracket having a hole for the passage of the safety bar and formed by the deflection of one of such portions.

SETH A. CRONE.